H. J. BRENNECKE.
GOGGLES.
APPLICATION FILED FEB. 2, 1914.
1,118,631.
Patented Nov. 24, 1914.
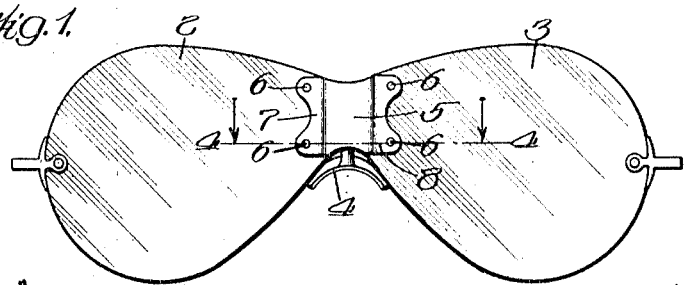
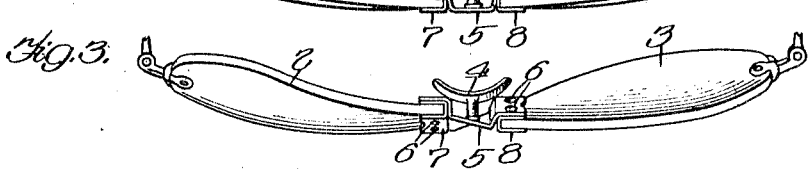
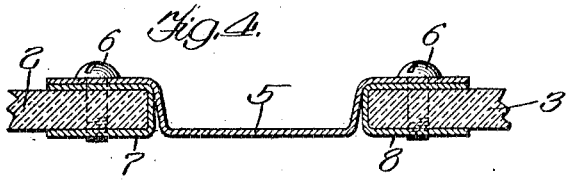
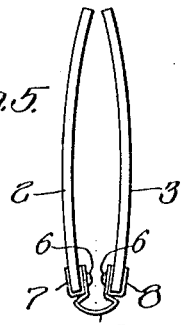
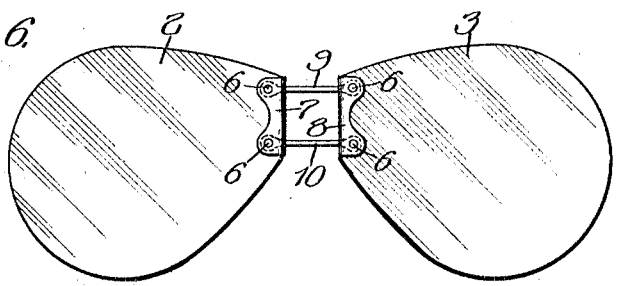
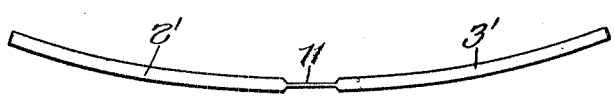
Witnesses:
Inventor:
Herman J. Brennecke

UNITED STATES PATENT OFFICE.

HERMAN J. BRENNECKE, OF CHICAGO, ILLINOIS, ASSIGNOR OF ONE-HALF TO FRANK IHRCKE, OF CHICAGO, ILLINOIS.

GOGGLES.

1,118,631.      Specification of Letters Patent.      Patented Nov. 24, 1914.

Application filed February 2, 1914. Serial No. 815,896.

*To all whom it may concern:*

Be it known that I, HERMAN J. BRENNECKE, a citizen of the United States, residing at Chicago, in the county of Cook and State of Illinois, have invented certain new and useful Improvements in Goggles, of which the following is a specification.

My invention relates to eye-glasses of the type known as goggles and has particular reference to their general use by drivers of automobiles.

The objects of this invention are to overcome the several objections to the relative movability of the lenses attained by hinging these lenses together, among which objections may be mentioned the lack of flexibility in the hinge, a flexibility that is necessary to permit the lenses to adjust themselves snugly against the temples, breaking of lenses where the hinges are attached, lack of support between the lenses that will coöperate with the bows to hold the goggles snug against the face and prevent them from bulging out over the nose of the wearer, and lack of means for holding the lenses normally alined.

With these objects in view the invention consists in the novel construction of goggles, combination and arrangement of parts therein, all as hereinafter described in detail, illustrated in the accompanying drawing, and more particularly pointed out in the appended claims.

In the drawing—Figure 1 is a face view of a pair of goggles embodying my invention. Fig. 2 is an edge view thereof. Fig. 3 is an edge view with the flexible connection between the lenses twisted so that the lenses are oppositely inclined, and each at an angle relative to what would be the axis of the hinge in a similar device using a hinge. Fig. 4 is an enlarged sectional view of the hinge joint itself with sections of the lenses broken away. Fig. 5 illustrates the flexibility of the connection which I have substituted for the hinge, in another direction than that shown in Fig. 3. Fig. 6 is a modification of Fig. 1. Fig. 7 is still another modification showing goggles made of a single piece of transparent material with a relatively weak or middle portion to provide the desired flexibility, this view being an edge view.

In the several views 2 and 3 represent the lenses and 4 is the usual nose-bow, the latter to be attached in any desired manner to the middle or flexible portion, which in Figs. 1, 2, 3, 4 and 5 is a thin plate of spring metal 5 which has its ends bent twice at right angles, as shown best in Fig. 4, so as to place these ends against one side of the lenses while the intermediate portion is flush with the opposite side of the lenses. The ends of the flexible spring connection 5 are secured to the lenses in any approved manner, as, for instance, by screws 6 which pass through U-shaped fittings 7 and 8 that engage the lenses and are, at one side, interposed between the lenses and the ends of the connection 5.

In Fig. 6 the connection 5 takes the form of a pair of spring wires 9 and 10 which are secured to the U-shaped fittings 7 and 8, and in Fig. 7 the connection is simply a thinned portion of a suitable transparent material which permits the lenses and their connection to be in one piece. Such materials as celluloid or mica may serve as illustrations of material which may be used for the purpose of the modification shown in Fig. 7, which, perhaps, in the simplest manner illustrates applicant's invention. In each of the forms shown the idea disclosed in Fig. 7 is included, namely, a flexible middle portion which serves to hold the lenses 2' and 3' extended in their normal positions relative to each other, which will flex in a graceful curve instead of at a sharp angle as the leaves of hinges, and which permit an angular adjustment of each lens relative to the other lens vertically as well as horizontally. What is termed the vertical adjustment is well illustrated in Fig. 3 where the lenses incline in opposite directions to their vertical positions when in use.

I claim as my invention—

1. The combination with a pair of glasses of the class described, of a readily flexible connection supporting a nose bow and which yields to bending and twisting strains and returns the glasses to their normal relative positions.

2. The combination with a pair of glasses of the class described, and with the nose-bow for same, of a flexible connection joining said glasses and supporting said nose-bow, said connection supporting said glasses in a definite normal position and yet serving to permit the relative angular movement of the glasses that a hinged connection for same would permit.

3. The combination with a pair of lenses of the class described and the nose-bow for same, of a flexible connection extending uninterruptedly from lens to lens as a support for same and said nose-bow, said flexible connection having greater flexibility than said lenses.

4. The combination with a pair of lenses of the class described and the nose-bow for same, of a flexible connection on which said nose-bow is mounted and which supports said lenses in a normal relative position to each other, said connection having greater flexibility than said lenses and permitting movement of each lens relative to the other lens in planes vertical to each other.

In testimony whereof I have hereunto set my hand in the presence of two subscribing witnesses:

HERMAN J. BRENNECKE

Witnesses:
FRANK IHRCKE,
EDWARD E. MILLER.

Copies of this patent may be obtained for five cents each, by addressing the "Commissioner of Patents, Washington, D. C."